US012401938B2

(12) United States Patent
Jin et al.

(10) Patent No.: US 12,401,938 B2
(45) Date of Patent: Aug. 26, 2025

(54) FULL-FREQUENCY BAND HIGH QUALITY ELECTRONIC PRODUCTS SPEAKER WITH A BAR AND SOUND TUNNELS

(71) Applicant: SUZHOU LI YUE MUSICAL INSTRUMENTS CO., LTD., Jiangsu (CN)

(72) Inventors: Haiou Jin, Suzhou (CN); Nianbo Wu, Suzhou (CN); Xinxi He, Suzhou (CN); Xinzhi Zhu, Suzhou (CN); Biying Li, Suzhou (CN); Ping Yang, Suzhou (CN)

(73) Assignee: SUZHOU LI YUE MUSICAL INSTRUMENTS CO., LTD., Suzhou (CN)

( * ) Notice: Subject to any disclaimer, the term of this patent is extended or adjusted under 35 U.S.C. 154(b) by 442 days.

(21) Appl. No.: 18/026,031

(22) PCT Filed: Dec. 15, 2020

(86) PCT No.: PCT/CN2020/136580
§ 371 (c)(1),
(2) Date: Mar. 13, 2023

(87) PCT Pub. No.: WO2022/036957
PCT Pub. Date: Feb. 24, 2022

(65) Prior Publication Data

US 2023/0336909 A1 Oct. 19, 2023

(30) Foreign Application Priority Data

Aug. 19, 2020 (CN) ........................ 202010839652.X

(51) Int. Cl.
*H04R 1/22* (2006.01)
*H04R 7/06* (2006.01)
(Continued)

(52) U.S. Cl.
CPC ................. *H04R 1/22* (2013.01); *H04R 7/06* (2013.01); *H04R 7/18* (2013.01); *H04R 9/025* (2013.01); *H04R 9/06* (2013.01); *H04R 2400/11* (2013.01)

(58) Field of Classification Search
CPC ..... B06B 1/0292; B06B 1/0648; B06B 1/045; H04R 9/04; H04R 1/24; H04R 1/02;
(Continued)

(56) References Cited

U.S. PATENT DOCUMENTS 3,688,011 A 8/1972 Yamamoto
2006/0239494 A1* 10/2006 Kimura .................. H04R 7/127 381/386
(Continued)

FOREIGN PATENT DOCUMENTS

CN 104464692 A 3/2015
CN 205283800 U 6/2016
(Continued)

OTHER PUBLICATIONS

Apr. 25, 2021 International Search Report issued in International Patent Application No. PCT/CN2020/136580.
(Continued)

*Primary Examiner* — Carolyn R Edwards
*Assistant Examiner* — Julie X Dang
(74) *Attorney, Agent, or Firm* — Oliff PLC

(57) ABSTRACT

A full-frequency band high quality electronic products speaker with a bar and sound tunnels, including a voice coil, metal plate, diaphragm and magnetically conductive structure; the diaphragm is annular, the outer edge combines with the speaker outer frame and the inner edge combines with the metal plate outer part; the diaphragm includes an annular bridge-type bar on the upper surface of the diaphragm inner edge, and located horizontally on the outside of the speaker
(Continued)

metal plate; the diaphragm upper surface includes four grooves, which diaphragm surface outside the bridge-type bar is divided into four resonance regions; each groove crosses the bridge-type bar; and are concave on the diaphragm upper surface forming sound tunnels. The diaphragm changes to the standard vibration mode, and the timbre of treble register is not bright and the timbre of bass register is not sonorous and mellow enough from the perspective of vibration, resonance and phonation.

7 Claims, 4 Drawing Sheets

(51) Int. Cl.
*H04R 7/18* (2006.01)
*H04R 9/02* (2006.01)
*H04R 9/06* (2006.01)

(58) Field of Classification Search
CPC . H04R 7/04; H04R 7/10; H04R 23/02; H04R 1/22; H04R 1/06; H04R 9/06; H04R 17/00; H04R 9/022; H04R 9/045; H04R 7/127; H04R 7/20; H04R 1/2803; H04R 1/2834; H04R 3/04; H04R 9/025; H04R 1/023; H04R 2207/021; H04R 9/047; H04R 7/14; H04R 31/006; H04R 7/02; H04R 7/06
USPC ....... 381/398, 397, 400, 423, 429, 426, 412, 381/186, 430, 421, 431, 424; 181/173, 181/172, 166, 171
See application file for complete search history.

(56) References Cited

U.S. PATENT DOCUMENTS

2007/0209866 A1* 9/2007 Frasl ........................ H04R 7/18 181/157
2008/0230304 A1* 9/2008 Windischberger ....... H04R 7/20 181/157
2009/0296978 A1* 12/2009 Kamimura ............... H04R 9/10 381/412
2012/0121121 A1* 5/2012 Wilk ...................... H04R 9/045 381/400
2014/0133690 A1* 5/2014 Yang ........................ H04R 9/02 381/400
2015/0256939 A1* 9/2015 Zhao ........................ H04R 9/06 381/116

FOREIGN PATENT DOCUMENTS

CN 209693035 U 11/2019
CN 111954135 A 11/2020

OTHER PUBLICATIONS

Feb. 16, 2023 International Preliminary Report on Patentability issued in International Patent Application No. PCT/CN2020/136580.

* cited by examiner

FULL-FREQUENCY BAND HIGH QUALITY ELECTRONIC PRODUCTS SPEAKER WITH A BAR AND SOUND TUNNELS

TECHNICAL FIELD

The invention relates to a speaker, in particular to a full-frequency band high quality electronic products speaker with a bar and sound tunnels. The electronic products speaker can be used in headphones, headsets, mobile phones, tablets, laptops and other electronic products.

Speakers (also known as loudspeakers) are a device that converts electrical signals into acoustic signals. As shown in FIG. 1 and FIG. 2, traditional speakers are usually composed of voice coil 1, metal plate 2, diaphragm 3, magnet, and magnetically conductive structure (not shown in the figures). When the speaker is working, the current of different sizes output by the amplifier is converted into sound waves through frequency waves, and its output energy is increased through the promotion of power. The voice coil 1 moves under the action of magnetic field. At the same time, the voice coil 1 is connected to the diaphragm 3 and drives the diaphragm 3 to vibrate, and then the vibration of the diaphragm 3 pushes the air to produce sound.

The common problem of traditional electronic products speakers is: The speaker has an inherent resonance frequency when it sounds. Beyond a certain range of the resonance frequency, the timbre of treble register is not bright enough, and the timbre of bass register is not mellow enough. The bass must be achieved by a special woofer, and the treble must be achieved by a special tweeter. In other words, the quality of timbre is proportional to the number of speakers. The high-quality timbre of the full frequency band cannot be achieved through a single speaker. The main reason is that the current speaker diaphragm can't complete a good broadband vibration between treble and bass register. That is to say, it can't simultaneously adapt to the resonance and vibration with wide-frequency changes of the treble, alto and bass register. The traditional electronic products speaker with unreasonable structure design is not conducive to the sound wave vibration of the diaphragm from treble register to bass register. In order to achieve the sound quality performance of the appreciation level, it is necessary to combine a number of different frequency band speakers. However, this would usually be expensive and not conducive to broadening the market. In addition, the larger volume requires more space for placement, which is not conducive to the development of electronic products to the direction of thin and light.

Therefore, how to solve the shortcomings of the above existing technologies has become the subject to be studied and solved by the invention.

SUMMARY OF THE INVENTION

The purpose of the invention is to provide a full-frequency band high quality electronic products speaker with a bar and sound tunnels.

To achieve the above purpose, the technical scheme adopted by the invention is:

A full-frequency band high quality electronic products speaker with a bar and sound tunnels, which is characterized in that: It comprises a voice coil, a metal plate, a diaphragm and magnetically conductive structure; the diaphragm is annular, of which outer edge is combined with the outer frame of the speaker and the inner edge is combined with the outer part of the metal plate; the middle of the metal plate is correspondingly arranged on the upper end of the voice coil; the diaphragm is provided with a bridge-type bar; the bridge-type bar is annular, arranged on the upper surface of the inner edge of the diaphragm, and located on the outside of the metal plate in the horizontal direction of the speaker;

the upper surface of the diaphragm is provided with four grooves; the extension lines of the grooves intersect the center of the horizontal direction of the diaphragm, and the adjacent grooves are mutually arranged at 90 degrees; the surface of the diaphragm located outside the bridge-type bar is divided into four resonance regions through the grooves; Each groove crosses the bridge-type bar in the horizontal direction of the speaker, and the length direction of the groove is perpendicular to the bridge-type bar; the grooves are concave on the upper surface of the diaphragm to form sound tunnels.

Relevant contents of the above technical scheme are explained as follows:

1. In the above scheme, the bridge-type bar is located on the outside of the metal plate in the horizontal direction of the speaker. By this design, the bridge-type bar and the voice coil have a distance, which helps to bring the sound vibration of the voice coil together.

2. In the above scheme, the extension line of the grooves intersects the center of the horizontal direction of the diaphragm, and the adjacent two grooves are arranged 90 degrees to each other, which helps to transfer the vibration of the voice coil through the cross sound tunnels formed by the grooves (that is, the tunnel of sound) rapidly to the perimeter of the diaphragm.

3. In the above scheme, the diaphragm is divided into a treble region in the outer section, an alto region in the middle section and a bass region in the inner section according to sound frequency band; the wall thickness of the diaphragm gradually increases from the outer edge to the inside, so that the wall thickness of the bass region is greater than that of the alto region, and the wall thickness of the alto region is greater than that of the treble region; the bridge-type bar is located in the bass region.

Through this design, the thicker bass region is set close to the position of the voice coil, which can make the low frequency vibration with lower frequency and larger amplitude send out more sonorous and mellow bass in the bass region of the diaphragm; By setting the thin treble region far away from the voice coil, the high frequency vibration with higher frequency and smaller amplitude will emit a more transparent and bright treble in the treble region of the diaphragm, so that the timbre and sound quality of the speaker in the full frequency band are effectively improved.

4. In the above scheme, the bottom of the bridge-type bar is provided with a bridge opening, the bridge opening is arranged through the width direction of the bridge-type bar, and the lower opening of the bridge opening corresponds to the groove.

Through this design, the bridge-type bar is located on the sound tunnel, which is more conducive to the transmission of vibration through the sound tunnels, so as to improve the vibration response rate of the diaphragm.

5. In the above scheme, when the diaphragm is horizontal, the center line of the upper and lower direction of the bridge-type bar overlaps with the center line of the upper and lower direction of the diaphragm, so as to improve the sound quality and timbre.

6. In the above scheme, the grooves are arc grooves, which reduce the sudden change of thickness of the diaphragm as far as possible and affect the resonance and vibration of the diaphragm.

7. In the above scheme, the length of the grooves is less than the width of the diaphragm, and a smooth transition surface is arranged between the two outer ends of the groove and the upper surface of the diaphragm.

8. In the above scheme, the diaphragm is also provided with a number of slots, and the slots are arranged radially, in order to enhance the structural strength of the diaphragm. Slots may be flat and straight in design to avoid interference with sound tunnels.

The working principle and advantages of the invention are as follows:

The invention discloses a full-frequency band high quality electronic products speaker with a bar and sound tunnels, which is characterized in that: It comprises a voice coil, a metal plate, a diaphragm and magnetically conductive structure; the diaphragm is annular, of which outer edge is combined with the outer frame of the speaker and the inner edge is combined with the outer part of the metal plate; the middle of the metal plate is correspondingly arranged on the upper end of the voice coil; the diaphragm is provided with a bridge-type bar; the bridge-type bar is annular, arranged on the upper surface of the inner edge of the diaphragm, and located on the outside of the metal plate in the horizontal direction of the speaker;

the upper surface of the diaphragm is provided with four grooves, which the surface of the diaphragm located outside the bridge-type bar is divided into four resonance regions through; Each groove crosses the bridge-type bar in the horizontal direction of the speaker, and the length direction of the groove is perpendicular to the bridge-type bar; the grooves are concave on the upper surface of the diaphragm to form sound tunnels.

Compared with the prior art, the present invention improves the previous electronic products speaker, especially the diaphragm design in the speaker, in order to solve the problem that the previous speaker is unable to take into account the treble, alto and bass registers and have good resonance timbre at the same time. It is embodied in the following aspects: first, a bridge-type bar is set up on the surface of the diaphragm; Second, the surface of the diaphragm is provided with a cross groove, the cross groove on the surface of the diaphragm to form a cross sound tunnel.

Aiming at the problem that the timbre of treble register of the previous electronic products speaker is not bright and the timbre of bass register is not sonorous and mellow enough, the structure and sound mechanism of the speaker are deeply discussed and studied, and the main reason for the poor timbre of treble register and bass register of the previous speaker is found out that the structure of the diaphragm is unreasonable. Therefore, the inventor breaks the shackles of the previous electronic products speaker composition design, and boldly proposes an improved scheme of the invention. This improved scheme changes the diaphragm from the previous free vibration mode to the current standard vibration mode, and solves the problem that the timbre of treble register of the previous electronic products speaker is not bright and the timbre of bass register is not sonorous and mellow enough from the perspective of vibration, resonance and phonation. The practice proves that the improved scheme has outstanding substantive characteristics and remarkable technical progress, and has obtained obvious technical results.

Due to the application of the above technical scheme, the invention has the following advantages and effects compared with the previous diaphragm of electronic products speaker:

1. The invention provides a bridge-style bar on the surface of the diaphragm. Because the bass has larger amplitude and lower frequency than the treble, the bass resonance is concentrated in the central region of the diaphragm close to the voice coil, and the treble resonance is concentrated in the peripheral edge region of the diaphragm, strengthening the intensity of the central region of the diaphragm and playing an important role in improving the timbre and sound quality of the bass region. Because the thickness of the diaphragm is thick in the central region and thin around, which is a the gradient structure (i.e. thin on the outside and thick on the inside), the strength of the central region of the diaphragm is enhanced, and the thickness difference between the central region of the diaphragm and the surrounding edge region is also changed, which can also play a beneficial role in improving the timbre and sound quality of the treble register.

2. The invention is provided with a cross groove on the surface of the diaphragm, and the cross groove actually forms a cross sound tunnel on the upper surface of the diaphragm, and the area close to the voice coil gathers the voice coil vibration and transmits it rapidly to the surrounding edge of the diaphragm through the cross sound tunnel (namely, the tunnel of sound), which plays a key role in improving the timbre and sound quality of the treble register.

3. The bar is designed as a bridge-style bar; especially one side of the bar is designed with a bridge opening (breach), so that the bar is more like a bridge arch structure. When the bar is located on the sound tunnel, it is more conducive to the transmission of vibration through the sound tunnel, so as to be more conducive to the resonance and rapid vibration response of the diaphragm.

4. Through the design of bridge-style bar and cross groove, the invention divides four resonance areas in the diaphragm. When the speaker works, the vibration of the voice coil is first transmitted to the central region of the diaphragm, and then transmitted to the resonance regions through the sound tunnel, and produces resonance and vibration, in order to amplify the vibration of the external sound source into the resonance sound of the diaphragm. Each resonance region can produce one sound wave, plus one original sound wave, a total of five sound waves. The amount of sound wave is the number of sound waves, which directly affects the timbre, penetration and volume of the diaphragm. Therefore, the design of the invention significantly improves the timbre of the treble and bass registers and increase the penetration and volume of the treble and bass registers.

5. Each groove of the invention adopts arc groove, which reduce the sudden change of thickness of the diaphragm as far as possible and avoid affecting the resonance and vibration of the diaphragm.

In the above figures: 1. voice coil; 2. metal plate; 3. diaphragm; 4. diaphragm; 5. bridge-type bar; 6. groove; 7. resonance region; 8. bridge opening; 9. slot.

SPECIFIC IMPLEMENTATION

The invention is further described in combination with the attached figures and embodiments below:

Embodiment: The present invention will be clearly explained by the following schematics and detailed descriptions. Any person skilled in the field, after learning the embodiments of the present invention, may change and modify them by the techniques taught by the present invention, which is not out of the spirit and scope of the present invention.

As used in this article, "connection" or "set up" may refer to the direct physical contact between two or more components or devices, or to the indirect physical contact between two or more components or devices, or to the interoperation or action of two or more components or devices.

The terms "comprise", "including", "provided", and etc. used in this article are all open terms, which means including but not limited to.

The terms used in this article, unless otherwise specified, usually have the common meaning of each word used in this field, in the content of this case and in the special content. Some words used to describe the invention will be discussed below or elsewhere in this specification to provide additional guidance for those skilled in the art on the description of the case.

The words "upper" and "lower" used in this article are directional words. In this invention, they are only used to describe the position relationship between the structures, not to define the specific direction of the protection scheme and actual implementation of the invention.

Figure 1:
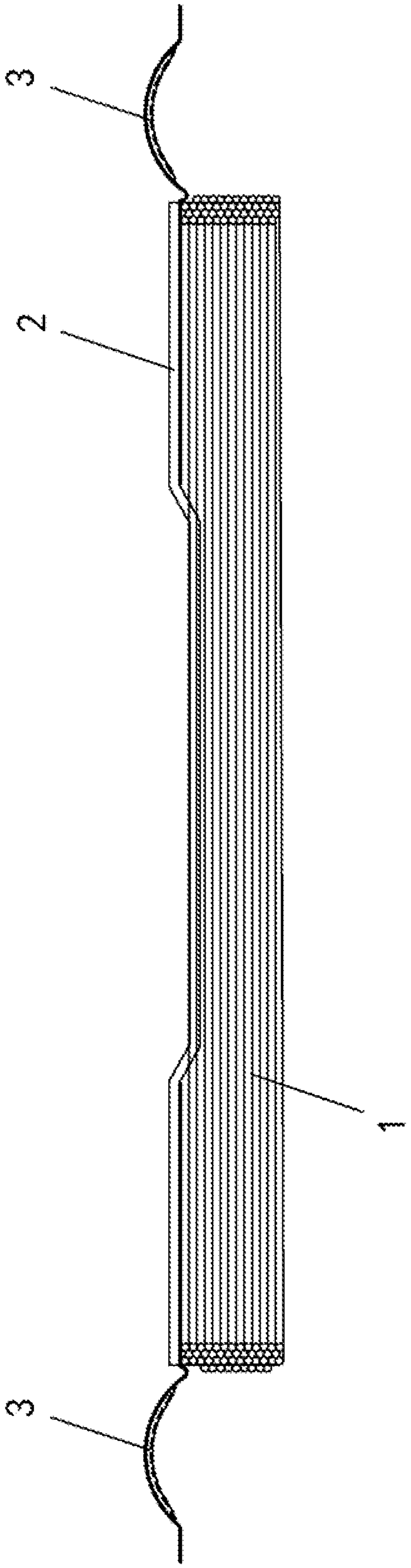
FIG. 1 is a structure diagram of the traditional electronic products speaker.
Figure 2:
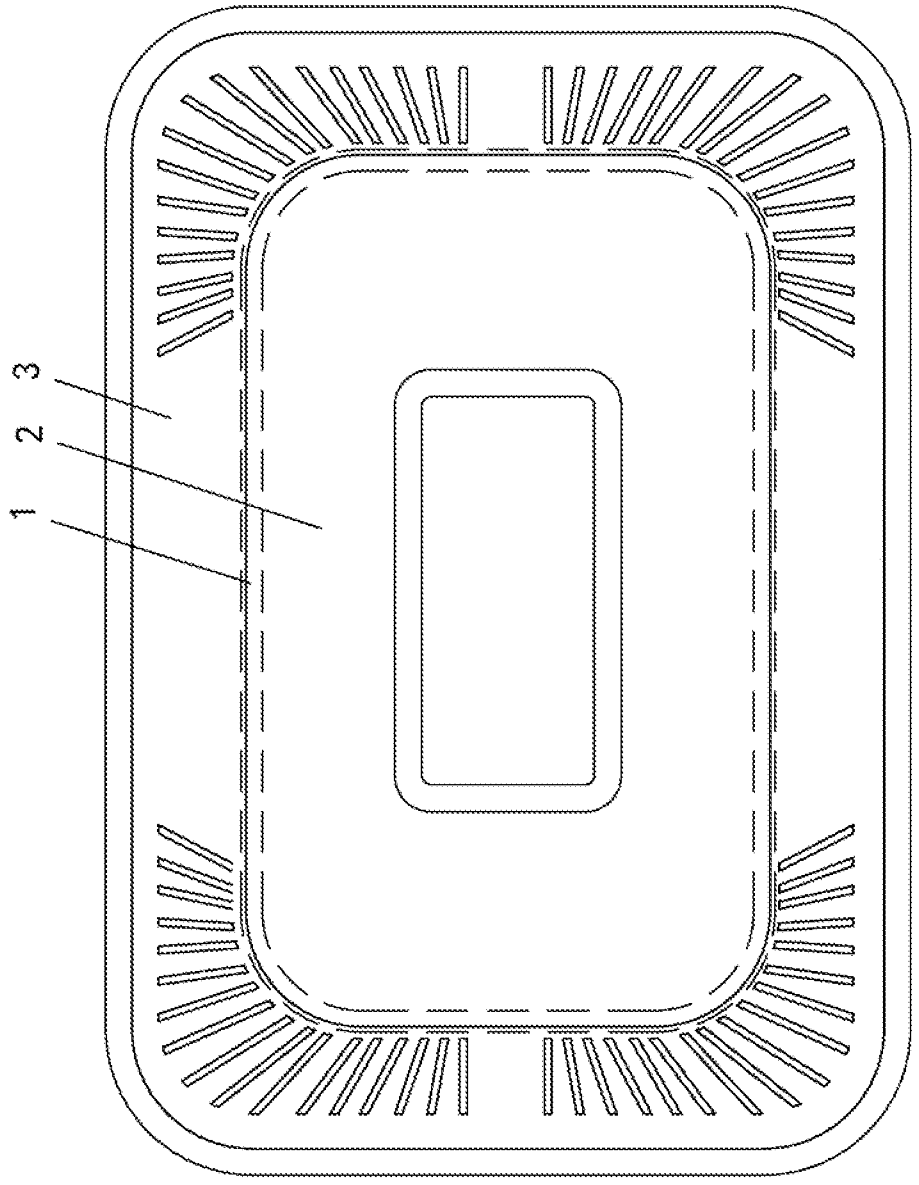
FIG. 2 is a top view diagram of traditional electronic product speaker.
Figure 3:
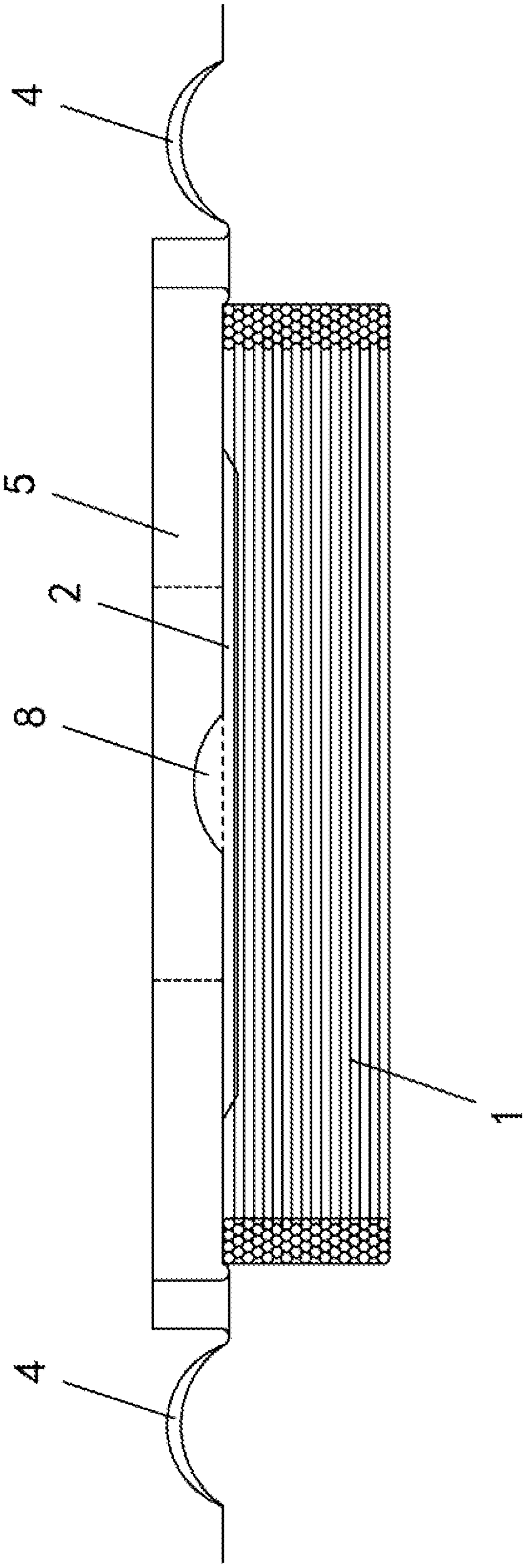
FIG. 3 is a structural diagram of embodiment of the invention.
Figure 4:
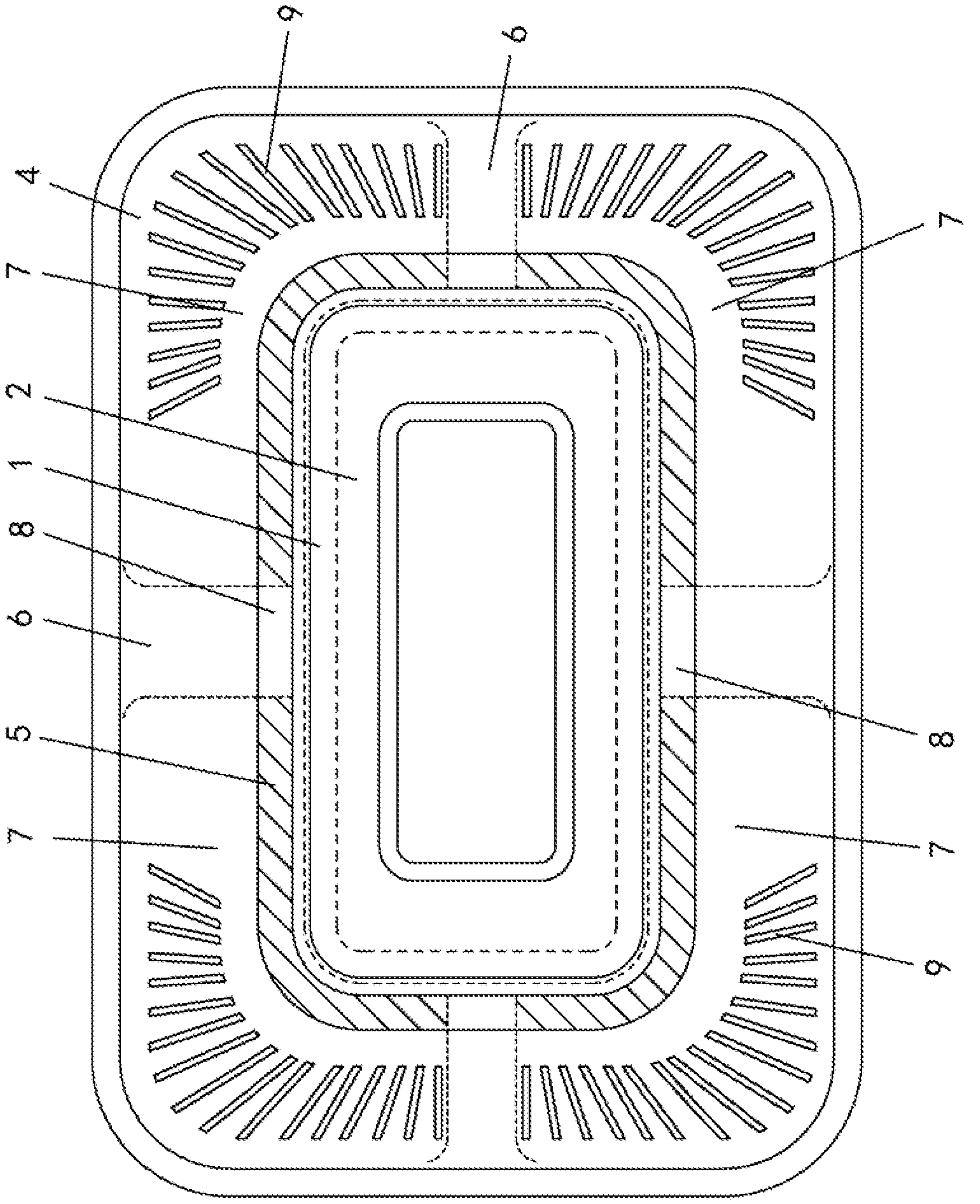
FIG. 4 is a top view diagram of the embodiment of the invention.

Refer to the attached FIGS. 3 and 4, a full-frequency band high quality electronic products speaker with a bar and sound tunnels, which is characterized in that:

It comprises a voice coil 1, a metal plate 2, a diaphragm 4 and magnetically conductive structure (not shown in the figures); the diaphragm 4 is annular, of which outer edge is combined with the outer frame of the speaker and the inner edge is combined with the outer part of the metal plate 2; the middle of the metal plate 2 is correspondingly arranged on the upper end of the voice coil 1.

The diaphragm 4 is provided with a bridge-type bar 5; the bridge-type bar 5 is annular, arranged on the upper surface of the inner edge of the diaphragm 4, and located on the outside of the metal plate 2 in the horizontal direction of the speaker.

Preferred, the diaphragm 4 is divided into a treble region in the outer section, an alto region in the middle section and a bass region in the inner section according to sound frequency band; the wall thickness of the diaphragm 4 gradually increases from the outer edge to the inside, so that the wall thickness of the bass region is greater than that of the alto region, and the wall thickness of the alto region is greater than that of the treble region; the bridge-type bar 5 is located in the bass region, increasing the middle load of diaphragm 4.

By setting the bridge-type bar 5 on the upper surface of the diaphragm 4, because the bass has a larger amplitude and lower frequency than the treble, the bass resonance is concentrated in the central region of the diaphragm 4 close to the voice coil 1, and the treble resonance is concentrated in the peripheral edge region of the diaphragm 4, strengthening the intensity of the central region of the diaphragm 4, which plays an important role in improving the timbre and sound quality of the bass region. Because the thickness of diaphragm 4 is the gradual structure of thickness in the central region and thin around (i.e. thin on the outside and thick on the inside), the strength of the central region of the diaphragm is enhanced, the thickness difference between the central region of the diaphragm 6 and the surrounding edge region is also changed, which also play a beneficial role in improving the timbre and sound quality of the treble register.

The upper surface of the diaphragm 4 is provided with four grooves 6; the extension lines of the grooves 6 intersect the center of the horizontal direction of the diaphragm, and the adjacent grooves 6 are mutually arranged at 90 degrees; the surface of the diaphragm 4 located outside the bridge-type bar 5 is divided into four resonance regions through the grooves 6; Each groove 6 crosses the bridge-type bar 5 in the horizontal direction of the speaker, and the length direction of the groove 6 is perpendicular to the bridge-type bar 5.

The grooves 6 are concave on the upper surface of the diaphragm 4 to form sound tunnels.

By setting a cross groove 6 on the surface of the diaphragm 4, the cross groove 6 actually forms a cross sound tunnel on the surface of the diaphragm 4, and the area close to the voice coil 1 collects the vibration of the voice coil 1, and quickly transmits to the surrounding edge of the diaphragm 4 through the cross sound tunnel (namely, the tunnel of sound), which plays a key role in improving the timbre and sound quality of the treble register. At the same time, the vibration will be transmitted to the four resonance regions 7 through sound tunnel by dividing the four resonance regions 7 on the diaphragm 4, and resonance can be generated, which significantly improve the timbre of the bass and treble registers.

The bottom of the bridge-style bar 5 is provided with a bridge opening 8; the bridge opening 8 is arranged through the width direction of the bridge-style bar 5, and the lower opening of the bridge opening 8 corresponds to the groove 6. The bar is designed as bridge-style bar 5 structure, especially the bridge opening 8 (breach) is designed on one side of the bar, so that the bridge-style bar 5 is like the bridge arch structure. When the bridge-style bar 5 is provided on the sound tunnel 7, it is more conducive to the transmission of vibration through sound tunnel 7, so as to be more conducive to the resonance and rapid vibration response of diaphragm 4.

Preferred, when the diaphragm 4 is horizontal, the center line of the upper and lower directions of the bridge-style bar 5 overlaps with the center line of the upper and lower directions of the diaphragm 4.

Preferred, the diaphragm 4 is also provided with a number of slots 9, and the slots 9 are arranged radially, in order to enhance the structural strength of the diaphragm 4. Slots 9 may be flat and straight in design to avoid interference with sound tunnels.

Each groove 6 of the invention adopts arc groove, which reduce the sudden change of thickness of the diaphragm 4 as far as possible and avoid affecting the resonance and vibration of the diaphragm 4. The length of the grooves 6 is less than the width of the diaphragm 4, and a smooth transition surface is arranged between the two outer ends of the groove 6 and the upper surface of the diaphragm 4.

Other implementations and structural changes of the invention are described as follows:

1. In the above embodiment, the speaker shown in the figures is only for illustration purposes, and its structure is not used to limit the protection scope of the invention. Other speakers of similar structure that adopt the technical characteristics of the invention shall be covered by the protection scope of the invention.

2. In the above embodiment, the bridge opening 8 is provided on the bridge-type bar 5, but the invention is not limited to this. Bridge opening 8 may not be provided, or other structures similar to bridge opening 8 may be provided to facilitate vibration transmission through sound tunnel, which is easy to be understood and accepted by those skilled in this field.

3. In the above embodiment, the number of the bridge-type bar 5 is not limited to one, but may also be multiple in parallel or other designs that help to strengthen the load in the middle of diaphragm 4, which is easily understood and accepted by those skilled in the field.

5. In the above embodiment, the grooves 6 are arc grooves. But the invention is not limited to this; the groove may be designed into other shapes, such as V shape, U shape, W shape, and other concave structure. This is easily understood and accepted by those skilled in the field.

6. In the above embodiment, the material of the diaphragm 4 may be metal, carbon fiber, composite material, paper material, and etc.

Compared with the prior art, the present invention improves the previous electronic products speaker, especially the diaphragm design in the speaker, in order to solve the problem that the previous speaker is unable to take into account the treble, alto and bass registers and have good resonance timbre at the same time. It is embodied in the following aspects: first, a bridge-type bar is set up on the surface of the diaphragm; Second, the surface of the diaphragm is provided with a cross groove, the cross groove on the surface of the diaphragm to form a cross sound tunnel.

Aiming at the problem that the timbre of treble register of the previous electronic products speaker is not bright and the timbre of bass register is not sonorous and mellow enough, the structure and sound mechanism of the speaker are deeply discussed and studied, and the main reason for the poor timbre of treble register and bass register of the previous speaker is found out that the structure of the diaphragm is unreasonable. Therefore, the inventor breaks the shackles of the previous speaker composition design, and boldly proposes an improved scheme of the invention. This improved scheme changes the diaphragm from the previous free vibration mode to the current standard vibration mode, and solves the problem that the timbre of treble register of the previous electronic products speaker is not bright and the timbre of bass register is not sonorous and mellow enough from the perspective of vibration, resonance and phonation, improving the fidelity of sound in each frequency band. The practice proves that the improved scheme has outstanding substantive characteristics and remarkable technical progress, and has obtained obvious technical results.

The above embodiments are only intended to illustrate the technical conception and characteristics of the invention, and enable persons familiar with the technology to understand the content of the invention and implement it accordingly, but don't limit the scope of protection of the invention. Any equivalent variation or modification made in accordance with the spirit substance of the invention shall be covered by the protection of the invention.

The invention claimed is:

1. A full-frequency band high quality electronic products speaker with a bar and sound tunnels, comprising:

a voice coil, a metal plate, a diaphragm and magnetically conductive structure; the diaphragm is annular, of which an outer edge is combined with an outer frame of the speaker and an inner edge is combined with an outer part of the metal plate; a middle of the metal plate is correspondingly arranged on an upper end of the voice coil;

the diaphragm is provided with a bridge-type bar; the bridge-type bar is annular, arranged on an upper surface of the inner edge of the diaphragm, and located on an outside of the metal plate in a horizontal direction of the speaker;

the upper surface of the diaphragm is provided with four grooves; extension lines of the grooves intersect a center of the horizontal direction of the diaphragm, and adjacent grooves are mutually arranged at 90 degrees; the surface of the diaphragm located outside the bridge-type bar is divided into four resonance regions through the grooves;

each groove crosses the bridge-type bar in the horizontal direction of the speaker, and a length direction of the groove is perpendicular to the bridge-type bar, wherein, the grooves are concave on the upper surface of the diaphragm to form sound tunnels.

2. The full-frequency band high quality electronic products speaker according to claim 1, wherein:

a bottom of the bridge-type bar is provided with a bridge opening;

the bridge opening is arranged through a width direction of the bridge-type bar, and a lower opening of the bridge opening corresponds to the groove.

3. The full-frequency band high quality electronic products speaker according to claim 1, wherein:

when the diaphragm is horizontal, a center line of an upper and lower direction of the bridge-type bar overlaps the center line of an upper and lower direction of the diaphragm.

4. The full-frequency band high quality electronic products speaker according to claim 1, wherein:

each groove is an arc groove.

5. The full-frequency band high quality electronic products speaker according to claim 1, wherein:

a length of the groove is less than a width of the diaphragm;

a smooth transition surface is arranged between two outer ends of the grooves and the upper surface of the diaphragm.

6. The full-frequency band high quality electronic products speaker according to claim 1, wherein:

the diaphragm is divided into a treble region in an outer section, an alto region in a middle section and a bass region in an inner section according to sound frequency band; a wall thickness of the diaphragm gradually increases from an outer edge to an inside, so that a wall thickness of the bass region is greater than that of the alto region, and the wall thickness of the alto region is greater than that of the treble region.

7. The full-frequency band high quality electronic products speaker according to claim 1, wherein:

the diaphragm is also provided with a number of slots, and the slots are arranged radially.

* * * * *